W. HANEL.
MEASURING APPARATUS.
APPLICATION FILED SEPT. 25, 1915.
1,204,865.
Patented Nov. 14, 1916.
2 SHEETS—SHEET 2.
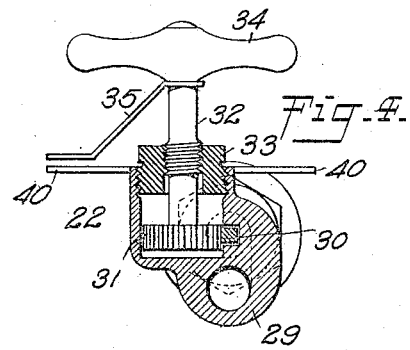
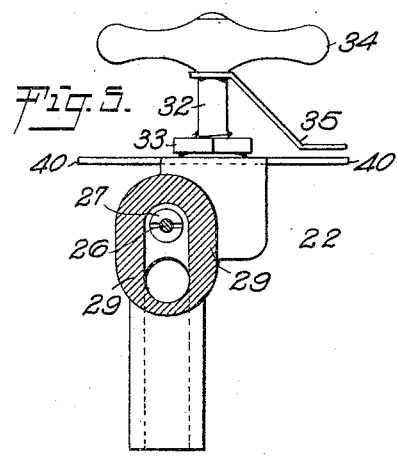
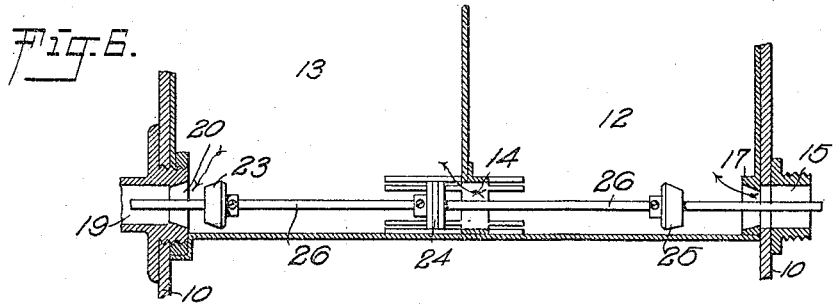
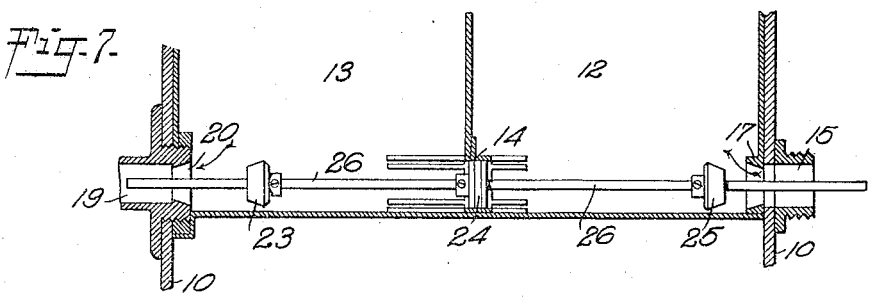
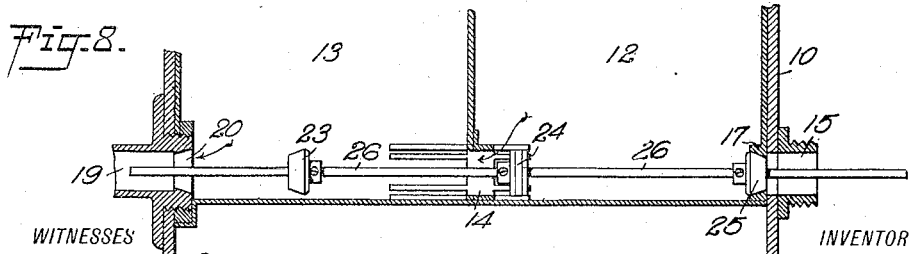
WITNESSES
INVENTOR
William Hanel
BY
ATTORNEYS

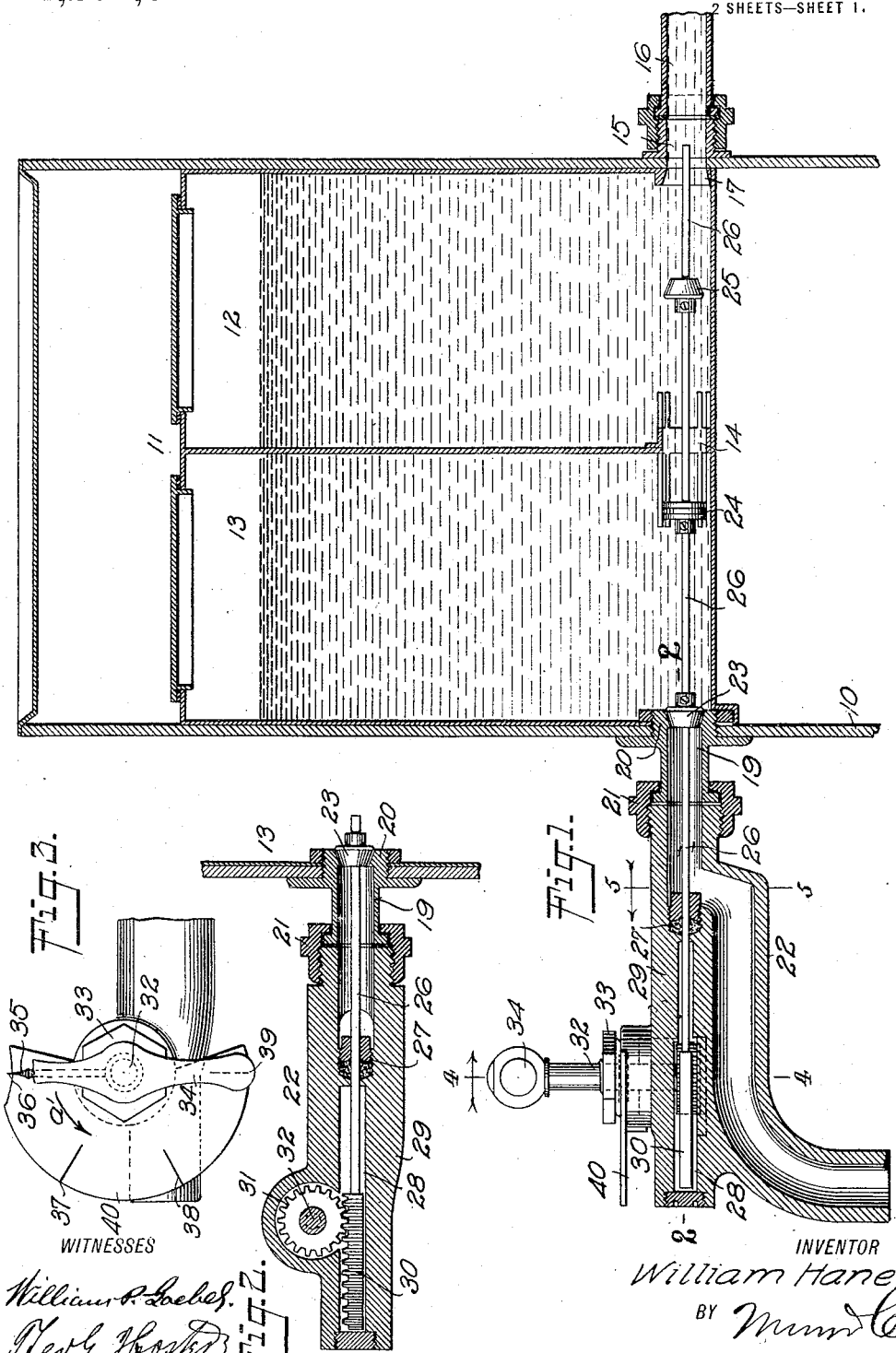

UNITED STATES PATENT OFFICE.

WILLIAM HANEL, OF JERSEY CITY, NEW JERSEY.

MEASURING APPARATUS.

1,204,865.

Specification of Letters Patent.

Patented Nov. 14, 1916.

Application filed September 25, 1915. Serial No. 52,543.

*To all whom it may concern:*

Be it known that I, WILLIAM HANEL, a citizen of the United States, and a resident of Jersey City, in the county of Hudson and State of New Jersey, have invented a new and Improved Measuring Apparatus, of which the following is a full, clear, and exact description.

The invention relates to dispensing beverages and its object is to provide a new and improved measuring apparatus, more especially designed for use in refreshment establishments and arranged to enable the barkeeper to draw liquid to be dispensed either by the glass or by the pint, quart or similar unit measure.

In order to accomplish the desired result use is made of a reservoir having an inlet compartment and an outlet compartment, the compartments being normally connected with each other, the inlet compartment having an inlet connected with a source of liquid supply and the outlet compartment being provided with an outlet connected with the draw-off faucet and a valve mechanism controlled by the faucet to open or close the said outlet at will for glass trade, to close the normally open connection between the said compartments while the outlet compartment is open, to drain the outlet compartment of its contents and to close the said inlet at the time the outlet is open and both compartments are connected with each other to allow of draining both compartments of their contents.

A practical embodiment of the invention is represented in the accompanying drawings forming a part of this specification, in which similar characters of reference indicate corresponding parts in all the views.

Figure 1 is a sectional side elevation of the measuring apparatus; Fig. 2 is a sectional plan view of the same on the line 2—2 of Fig. 1; Fig. 3 is a plan view of the draw-off faucet; Fig. 4 is a cross section of the same on the line 4—4 of Fig. 1; Fig. 5 is a similar view of the same on the line 5—5 of Fig. 1; and Figs. 6, 7 and 8 are sectional side elevations of a portion of the apparatus and showing more particularly the valve mechanism in different positions.

The measuring apparatus is preferably mounted on a bar 10 and the beer, ale or other liquid to be dispensed is contained in a reservoir 11 mounted on the bar and having an inlet compartment 12 and an outlet compartment 13, the compartments 12 and 13 being connected with each other at their bottoms by a valve seat 14 to allow the liquid to normally flow from the compartment 12 into the compartment 13. The compartments 12 and 13 are of the same capacity and preferably one pint, one quart or a similar unit measure. The inlet compartment 12 is provided with an inlet 15 connected by a pipe 16 with a source of liquid supply, and the said inlet 15 is provided within the compartment 12 with a valve seat 17. The outlet compartment 13 is provided with an outlet 19 having a valve seat 20 in coaxial relation to the valve seats 14 and 17. The outlet 19 is connected by a coupling 21 with a draw-off faucet 22 under the control of the barkeeper or other person.

The valve seats 20, 14 and 17 are controlled by valves 23, 24 and 25 secured on a valve stem 26 which extends through the outlet 19 and through the inlet end of the faucet 22 to pass through a stuffing box 27 into a recess 28 formed in the body 29 of the draw-off faucet 22. On the valve stem 26 within the recess 28 is secured or formed a rack 30 in mesh with a gear wheel 31 secured on a shaft 32 extending through a cap 33 arranged on the top of the body 29. The upper end of the shaft 32 is provided with a suitable handle 34 under the control of the barkeeper to enable the latter to turn the shaft 32 and with it the gear wheel 31 to impart a longitudinal movement to the rack 30 and the valve stem 26 with a view to shift the valves 23, 24 and 25, as hereinafter more fully explained. On the shaft 32 is secured a pointer 35 indicating on marks 36, 37, 38 and 39 of a dial 40 attached to the body 29 of the draw-off faucet. When the handle 34 and the pointer 35 are in the position shown in Figs. 1, 2 and 3 then the valve 23 is in closed position on its seat 20. When the barkeeper turns the handle in the direction of the arrow *a'* until the pointer 35 reaches the mark 37 then the valve 23 is moved into an open position (see Fig. 6) to allow the liquid to flow from the compartment 13 through the faucet 22 into a glass to be filled, and when this has been done the handle 34 is returned to normal closed position to return the valve 23 to closed position on its seat 20. It will be noticed that the valves 24 and 25 are in open position relative to their seats 14 and 17 when the valve 23 is in closed position, and when it is moved into open position for drawing off a glass of beer or other liquid as above described and shown in Fig. 6. It will be noticed that the amount of liquid withdrawn from the compartment 13 is replenished from the liquid in compartment 12, which latter is replenished from the source of liquid supply.

When it is desired to draw off a measured quantity of liquid, say a pint, then the barkeeper turns the handle 34 until the pointer 35 registers with the mark 38 so that the valve 23 moves into open position while the valve 24 moves into closed position on its valve seat 14 and the valve 25 still remains open relatively to its valve seat 17. The contents of the compartment 13, which correspond to a pint, now pass through the open faucet 22 into a pail, can or other receptacle to be filled with one pint of the liquid. When this has been done, the handle 34 is returned to closed position so that the valve 23 moves back to its seat 20 while the valve 24 moves back into open position to allow refilling of the compartment 13 from the compartment 12 supplied with liquid from the source of supply.

When it is desired to draw off two pints, then the barkeeper turns the handle 34 until the pointer 35 registers with the mark 39 so that the valves 23 and 24 move into open position (see Fig. 8) while the valve 25 moves into closed position on its seat 17 thus cutting off the supply from the compartment 12. It will be noticed that the liquid contents of both compartments 12 and 13 are now drained off through the faucet 22 into a pail or other receptacle and as the correct amount of liquid contained in the compartments 12 and 13 corresponds to two pints, it is evident that the desired amount of the liquid is drawn off. When this has been done the handle 34 is returned to normal closed position so that the valves 23, 24 and 25 move back into the position shown in Fig. 1 to allow the compartments 12 and 13 to be refilled with liquid.

From the foregoing it will be seen that the barkeeper can draw off glasses of the liquid as demanded by the regular trade, and he can also draw off measured quantities as one pint, two pints or other unit measure.

Having thus described my invention, I claim as new and desire to secure by Letters Patent:

1. A measuring apparatus comprising an inlet compartment having an inlet connected with a source of liquid supply, an outlet compartment in communication with the inlet compartment and having an outlet, a valve stem carrying valves for controlling the said inlet and outlet and the communication between said compartments, a faucet body secured to the said outlet and into which the valve stem projects, a manually operated shaft mounted in the faucet body, and means for operating the valve stem from the said shaft.

2. A measuring apparatus comprising an inlet compartment having an inlet connected with a source of liquid supply, an outlet compartment in communication with the inlet compartment and having an outlet, a valve stem carrying valves for controlling the said inlet and outlet and the communication between said compartments, the valve stem projecting through the outlet and formed with a rack on its projecting end, a faucet body secured to the outlet and into which the valve stem projects, a manually operated shaft mounted in the faucet body, and a gear wheel mounted on the shaft and meshing with the rack of the valve stem.

3. A measuring apparatus, comprising an inlet compartment having an inlet connected with a source of liquid supply, an outlet compartment in communication with the inlet compartment and having an outlet, a valve stem carrying valves for controlling the said inlet and outlet and the communication between the said compartments, the valve projecting through the outlet, a faucet body secured to the outlet and into which the valve stem projects, a manually operated shaft mounted in the faucet body means for operating the valve stem from the shaft, a dial secured to the faucet body, and a pointer secured to the said shaft and indicating on the dial.

4. A measuring apparatus, comprising a reservoir, vertically disposed inlet and outlet compartments arranged above the bottom of the reservoir and having a valve seat in the vertical partition between them, the inlet compartment having an inlet connected with a source of liquid supply and provided with a valve seat at the inlet within the compartment and the outlet compartment having an outlet and provided with a valve seat at the outlet within the compartment, a valve stem having a valve for each of the said valve seats and projecting through said outlet, a faucet body secured to the outlet and into which the valve stem projects, a manually operated vertical shaft mounted in the faucet body, and means for operating the valve stem from the said shaft.

In testimony whereof I have signed my name to this specification in the presence of two subscribing witnesses.

WILLIAM HANEL.

Witnesses:
 FRED RICKER,
 GEORGE P. WILLIAMSON.

Copies of this patent may be obtained for five cents each, by addressing the "Commissioner of Patents, Washington, D. C."